United States Patent

Yamamoto et al.

[11] Patent Number: 6,018,691
[45] Date of Patent: Jan. 25, 2000

[54] VEHICLE STEERING SYSTEM

[75] Inventors: Yorihisa Yamamoto; Yutaka Nishi; Takashi Nishimori; Hiroyuki Tokunaga, all of Saitama-ken, Japan

[73] Assignee: Honda Giken Kogyo Kabushiki Kaisha, Tokyo, Japan

[21] Appl. No.: 08/218,135

[22] Filed: Mar. 25, 1994

[30] Foreign Application Priority Data

Jun. 29, 1993  [JP]  Japan ................................ 5-186948

[51] Int. Cl.⁷ .................. B62D 5/06; G06F 7/70
[52] U.S. Cl. .................. 701/41; 701/43; 180/446; 180/404; 73/118.1
[58] Field of Search ................... 364/424.01, 424.02, 364/424.03, 424.04, 424.05; 180/140, 141, 142, 143, 79.1, 402, 404, 407, 422, 444, 446; 73/118.1; 701/36, 41, 42, 43

[56] References Cited

U.S. PATENT DOCUMENTS

| | | | |
|---|---|---|---|
| 4,830,127 | 5/1989 | Ito et al. ................................. | 180/79.1 |
| 4,860,844 | 8/1989 | O'Neil ................................... | 180/79.1 |
| 4,909,343 | 3/1990 | Mouri et al. ........................... | 180/142 |
| 4,966,249 | 10/1990 | Imaseki ................................. | 180/233 |
| 4,984,646 | 1/1991 | Sano et al. ............................. | 180/79.1 |
| 5,010,970 | 4/1991 | Yamamoto ............................. | 180/79.1 |
| 5,014,801 | 5/1991 | Hirose ................................... | 180/140 |
| 5,029,466 | 7/1991 | Nishihara et al. ..................... | 73/118.1 |
| 5,078,226 | 1/1992 | Inagaki et al. ......................... | 180/141 |
| 5,094,127 | 3/1992 | Ishida et al. ........................... | 74/866 |
| 5,097,420 | 3/1992 | Morishita ............................... | 364/424.05 |
| 5,097,917 | 3/1992 | Serizawa et al. ...................... | 180/79.1 |
| 5,135,069 | 8/1992 | Hattori et al. ......................... | 188/142 |
| 5,225,984 | 7/1993 | Nakayama et al. .................... | 364/424.05 |
| 5,236,335 | 8/1993 | Takeuchi et al. ...................... | 180/79.1 |
| 5,247,441 | 9/1993 | Serizawa et al. ...................... | 364/424.05 |
| 5,253,725 | 10/1993 | Nishimoto ............................. | 180/79.1 |
| 5,271,475 | 12/1993 | Takeshita .............................. | 180/79.1 |
| 5,360,077 | 11/1994 | Nishimoto et al. ................... | 180/79.1 |

FOREIGN PATENT DOCUMENTS

| | | |
|---|---|---|
| 815080 | 6/1959 | United Kingdom . |
| 1411829 | 10/1975 | United Kingdom . |
| 2205541 | 12/1988 | United Kingdom . |

*Primary Examiner*—Jacques H. Louis-Jacques
*Attorney, Agent, or Firm*—Carrier, Blackman & Associates, P.C.; Joseph P. Carrier; William D. Blackman

[57] ABSTRACT

According to the invention, there is provided is a vehicle steering system which can improve the resistance of a vehicle against external disturbances such as crosswind, and can prevent the operability of the steering system from being seriously affected by a failure in a part of the system related to the generation of steering reaction such as a lateral acceleration sensor, a yaw rate sensor or a reaction control unit. Because the assisting steering torque continues to be produced even when a failure has occurred in a part related to the generation of steering reaction. Therefore, a fail-safe feature can be obtained, and unnecessary loss of the operability of the steering system can be avoided. By reducing the assisting steering torque from the normal level, which is effective when the sensors are operating normally, at such a time, the driveability of the steering system similar to that under the normal condition can be ensured.

11 Claims, 9 Drawing Sheets

VEHICLE STEERING SYSTEM

TECHNICAL FIELD

The present invention relates to a vehicle steering system, and in particular to a vehicle steering system which can produce a steering torque that controls the vehicle behavior when the vehicle is subjected to an external disturbance such as crosswind.

BACKGROUND OF THE INVENTION

As a system for reducing the steering effort required by a vehicle operator, or a so-called power steering system, the type, for instance, disclosed in Japanese patent publication (kokoku) No. 50-33584 is known. According to this power steering system, the steering torque applied from a steering wheel is assisted by an output torque of an electric motor. By varying the gain for the detected signal corresponding to the steering torque applied to the steering wheel by a vehicle operator according to the vehicle speed and the road condition, the output torque of the assisting electric motor is adjusted so that an optimum steering torque may be obtained at all times.

When a vehicle encounters a strong crosswind or side wind, the vehicle tends to deviate from the intended straight path of travel. To maintain the vehicle on the straight path, it is necessary to apply a reaction to the steerable wheels which opposes such an external disturbance.

According to the conventional power steering system, however, the assisting torque is produced only when the vehicle operator has applied some steering torque to the steering wheel. Therefore, when the vehicle deviates from the intended straight path of travel due to crosswind, the electric motor will not produce any assisting torque by itself.

Therefore, to prevent the deviation of the vehicle from the intended path, the vehicle operator must constantly apply a manual steering torque to the steering wheel. According to the conventional steering system, the assisting torque is generally small when the lateral acceleration and the yaw rate of the vehicle are large. Therefore, when the vehicle deviates from an intended path of travel, the steering input necessary to restore the vehicle to the intended path of travel becomes progressively greater as the lateral acceleration and the yaw rate of the vehicle increase.

Thus, to overcome this inconvenience, it has been proposed to detect an irregular behavior of the vehicle caused by an external disturbance from the yaw rate or lateral acceleration of the vehicle, and to produce a reaction with an electric motor for producing a steering torque which cancels the effect of such a disturbance so that the irregular behavior of the vehicle due to external disturbances may be controlled.

However, according to such a control system using an electric motor, for instance, if the lateral acceleration sensor, the yaw rate sensor or the reaction control device should fail, there would be no steering torque as it is normal to stop the electric motor in such a situation, and this would not only cause discomfort to the vehicle operator but also impair the convenience of the steering system.

BRIEF SUMMARY OF THE INVENTION

The present invention was made in view of such problems of the known systems, and its primary object is to provide a vehicle steering system which improves the resistance of the vehicle against the tendency of the vehicle to deviate from an intended straight path when the vehicle is subjected to an external disturbance such as crosswind, and prevents the total loss of the function of the vehicle steering system even when a part of the system has failed.

A second object of the present invention is to provide a vehicle steering system which can stabilize the lateral vehicle movement even when the vehicle is subjected to external disturbances such as crosswind without substantially reducing the reliability of the steering system by providing an assisting steering torque even when a failure has occurred to the steering system as long as the parts required for providing an assisting steering torque is operable.

These and other objects of the present invention can be accomplished by providing a vehicle steering system, comprising: power means for applying a steering torque to steerable wheels of a vehicle; power assist control means for detecting a steering torque input produced by a steering effort made by a vehicle operator, and producing a command to the power means to produce an assisting steering torque according to detected steering torque input; and reaction control means for producing a command to the power means to produce a steering wheel reaction in response to a turning maneuver of the vehicle; further comprising: failure detecting means for detecting a failure of the reaction control means; when the failure detecting means has detected a failure in the reaction control means, the reaction control means being prohibited from producing the command to the power means to produce the steering wheel reaction. Typically, the reaction control means comprises sensor means such as a lateral acceleration sensor and a yaw rate sensor to detect a turning maneuver of the vehicle, and a reaction control unit for producing a drive signal to the power means according to an output from the sensor means.

Thus, even when the lateral acceleration sensor, the yaw rate sensor or the reaction control device has failed, the assisting steering torque is continued to the produced, and the function of the vehicle steering system will not be totally lost. Normally, said failure detecting means is adapted to additionally detect a failure of another part of said vehicle steering system, and preferably stops an overall control of said vehicle steering system when it has detected an important failure in said other part of said vehicle steering system as a fail-safe feature.

If the assisting steering torque produced by the power means according to a command from the power assist control means is reduced from a normal level when the failure detecting means has detected a failure in the reaction control means, the impression of the vehicle steering system by the vehicle operator will not be significantly affected by the failure because the reduction in the assisting steering torque is substantially equivalent to the application of steering reaction to the steering wheel.

If the reliability of the vehicle steering system is desired to be maximized, the power assist control unit of the power assist control means may be capable of operating independently from the reaction control unit. This is important because a microprocessor is normally used as the CPU for such control units, and providing separate microprocessors for the power assist control unit and the reaction control unit can be substantially reduced the possibility of a failure in the power assist control means.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
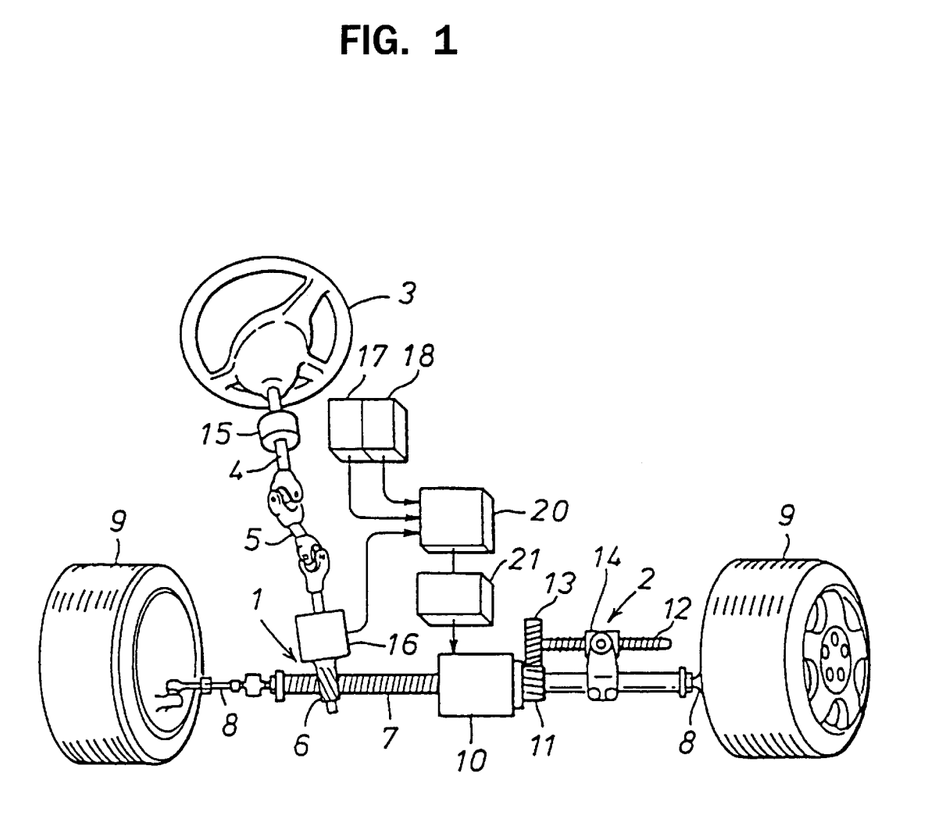
FIG. 1 is a schematic view of the overall structure of the vehicle steering system given as a first embodiment of the present invention.

FIG. 1 shows the structure of a first embodiment of the vehicle steering system according to the present invention. This system comprises a manual steering device 1 and an electric power steering device 2. A steering shaft 4 integrally connected to a steering wheel 3 at its upper end is connected, via a connecting shaft 5 and associated universal joints, to a pinion 6 of a rack and pinion mechanism. A rack 7 meshing with the pinion 6 extends laterally and is adapted to move laterally in either direction, and its two ends are connected to knuckle arms of front wheels 9 via tie rods 8, respectively. Thus, the normal manual steering action can be accomplished by using this rack and pinion mechanism.

An electric motor 10 serving as torque generating means is coaxially disposed around the rack 7. The electric motor 10 is provided with a hollow rotor through which the rack 7 is passed, and a helical drive gear 11 is mounted on the rotor. The helical drive gear 11 meshes with a helical driven gear 13 attached to an axial end of a screw shaft 12 of a ball screw mechanism disposed in parallel with the rack 7. The nut 14 of the ball screw mechanism is fixedly secured to the rack 7.

The steering shaft 4 is provided with a steering angle sensor 15 for producing a signal corresponding to the rotational angle of the steering wheel 3, and a torque sensor 16 for producing a signal corresponding to the input steering torque of the steering shaft 4.

The vehicle body carries thereon a yaw rate sensor 17 for producing a signal corresponding to the yaw rate of the vehicle, and a vehicle speed sensor 18 for producing a signal corresponding to the travelling speed of the vehicle.

In this embodiment, the steering wheel 3 and the steerable wheels or the front wheels 9 are mechanically coupled, and the output torque of the electric motor 10 is controlled by feeding a control signal obtained by a control unit 20 according to the outputs from the sensors 15 through 18 to the electric motor 10 via a drive circuit 21.

Figure 2:
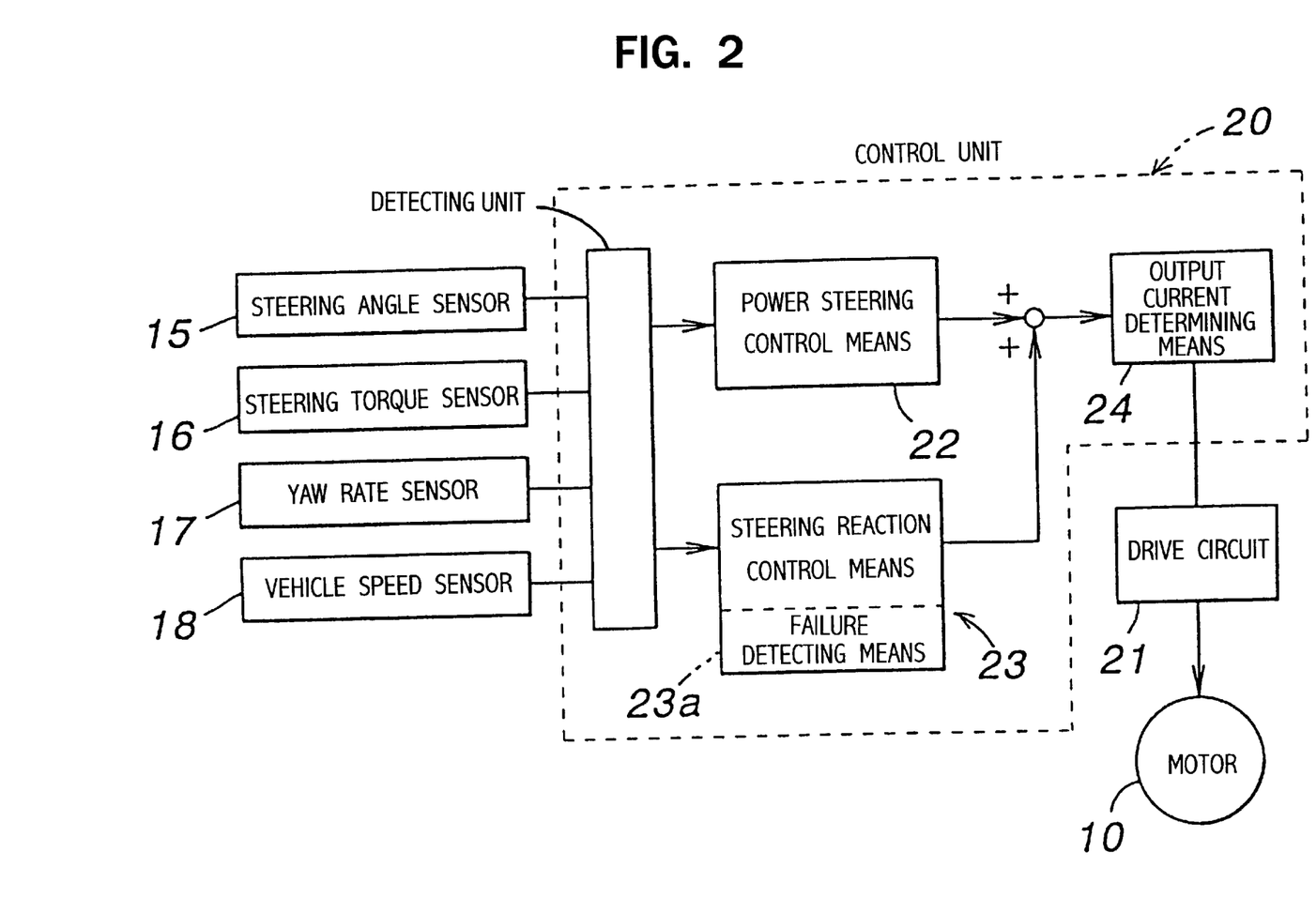
FIG. 2 is a circuit block diagram showing the structure of the control system for the steering system.

FIG. 2 is a block diagram of the control system for the vehicle steering system according to the present invention. The control unit 20 receives the output signals from the steering angle sensor 15, the steering torque sensor 16, the yaw rate sensor 17, and the vehicle speed sensor 18. These signals are supplied to electric power steering control means 22 and active steering reaction computing means 23, and, according to the output signals from these means, output current determining means 24 determines a target current which is to be supplied to the electric motor 10.

The electric power steering control means 22 carries out the normal control action for assisting the manual steering input. This control means 22 determines a target steering torque value according to the yaw rate according to the principle of the known electric power steering control, and detailed description thereof is omitted.

In the active steering reaction control means 23, a target steering reaction torque is determined by a prescribed algorithm according to the output signals from the sensors 15 through 18. The active steering reaction control means 23 is provided with failure detecting means 23a which carries out a diagnosis on the sensors and the active steering reaction control means 23. The failure detecting means 23a prohibits the output of the target reaction value from the active steering reaction control means 23, and, instead, supplies a fixed target reaction value depending on the result of the diagnosis.

The diagnosis of the torque sensor 16 and the yaw rate sensor 18 is carried out by determining if their output values (voltage values) are each within a prescribed range defined between the ground level and the voltage of the power supply, if the time history of their outputs are each within a reasonable range for an actual vehicle, and if the yaw rate estimated from the steering angle of the steering wheel and the vehicle speed is approximately proportional to the output from the yaw rate sensor. The diagnosis of the active steering reaction computing means 23 itself may be based on a fail signal from a known watch dog circuit, and a determination if the output value from the control means 23 is within a range corresponding to a reasonable range of the yaw rate.

In the output current determining means 24, a target drive current signal is obtained as a value substantially proportional but opposite in phase to the deviation of the actual torque value obtained from the torque sensor from the target torque value.

The target drive current value thus obtained is supplied to the drive circuit 21. The drive circuit 21 controls the electric motor 10, for instance, by PWM control, and the actual electric current supplied to the electric motor 10 is detected by a current sensor and fed back to the input of the drive circuit 21 for comparing it with the target drive current value.

Figure 3:
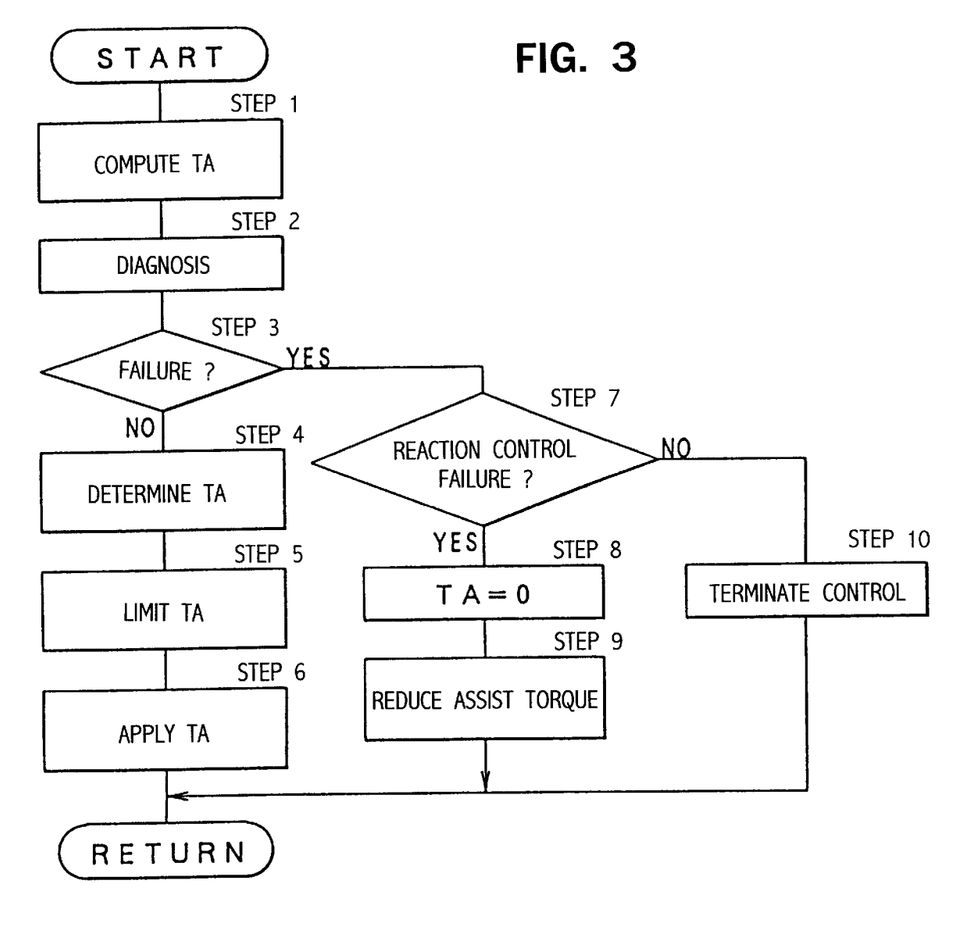
FIG. 3 is a flow chart showing the control process for the steering system.

In the active steering reaction computing means 23 of the control unit 20, the process shown in the flow chart of FIG. 3 is executed at a prescribed interval. First of all, the signals from the various sensors are read and the steering angular speed and the yaw rate deviation are computed in step 1. The electric power steering device 2 is then diagnosed in step 2, and if no failure is detected in step 3 the program flow advances to step 4 to determine a target steering reaction TA. A limit is imposed on the target steering reaction TA in step 5. This control signal is then added to the output from the electric power steering control means 22 in step 6.

If a failure is detected in step 3, the program flow advances to step 7, and it is determined if the failure occurred to the parts for generating a reaction such as the yaw rate sensor 17 and the active reaction control means 23. If the failure occurred to any of the reaction generating parts, the target steering reaction TA is set to zero in step 8, and the steering torque value is reduced from the normal level in step 9. If the failure did not belong to any of the reaction generating parts or determination is not possible in step 6, the program flow advances to step 10 to stop the overall control of the electric power steering device 2 and terminates the control process. This is necessary because it is most desirable to stop the overall control and avoid any unpredictable behavior of the vehicle steering system if a failure has occurred to any important part of the vehicle steering system. This process is shown in the control block diagram of FIG. 4.

Figure 5:
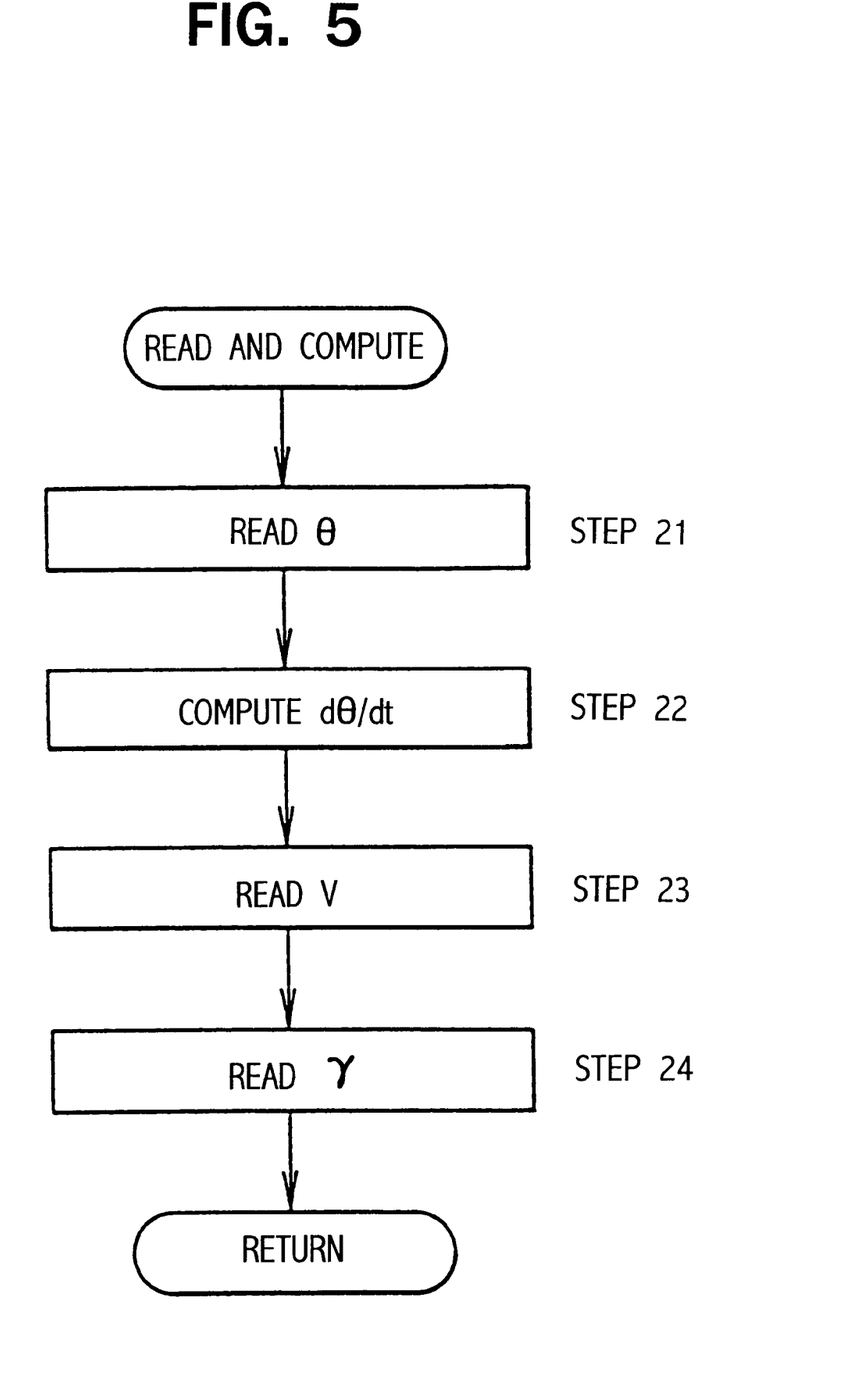
FIG. 5 is a flow chart showing the control process for the steering system.
Figure 6:
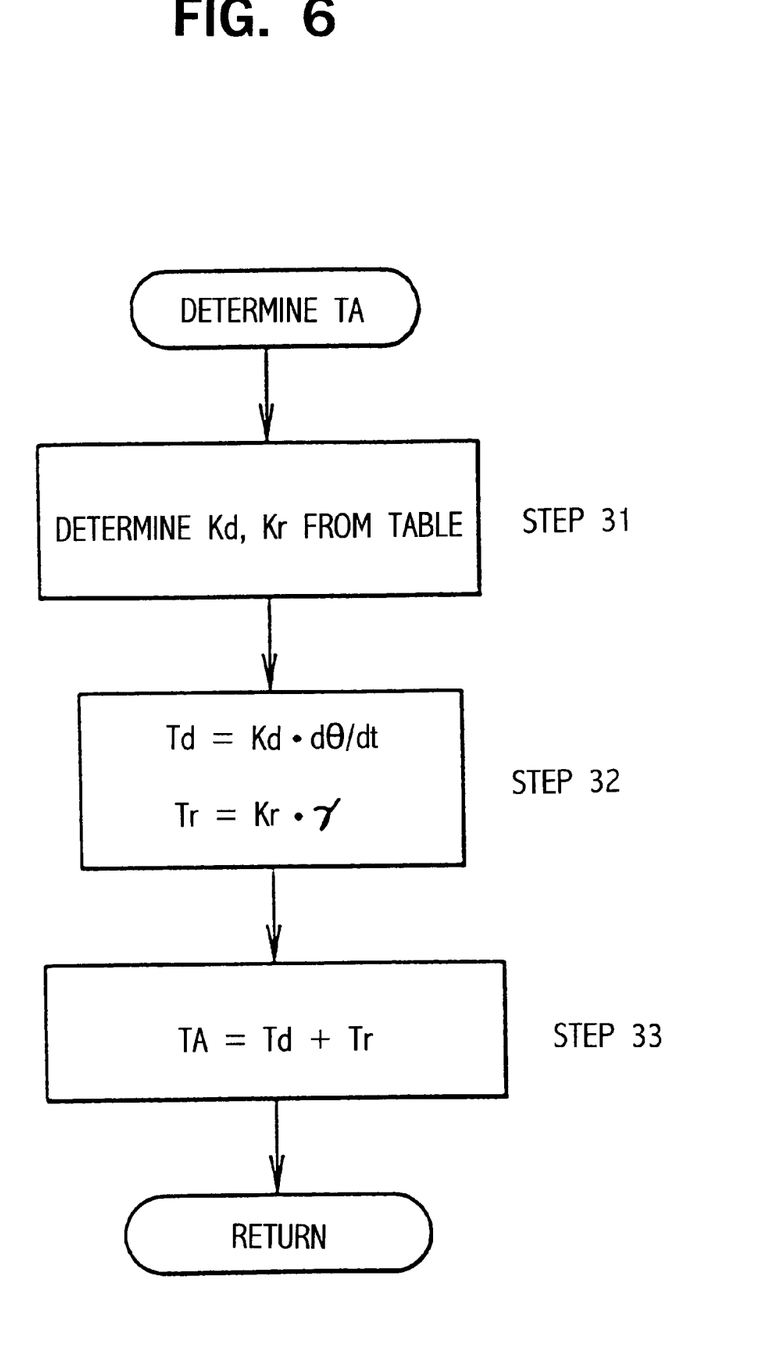
FIG. 6 is a flow chart showing the control process for the steering system.
Figure 7:
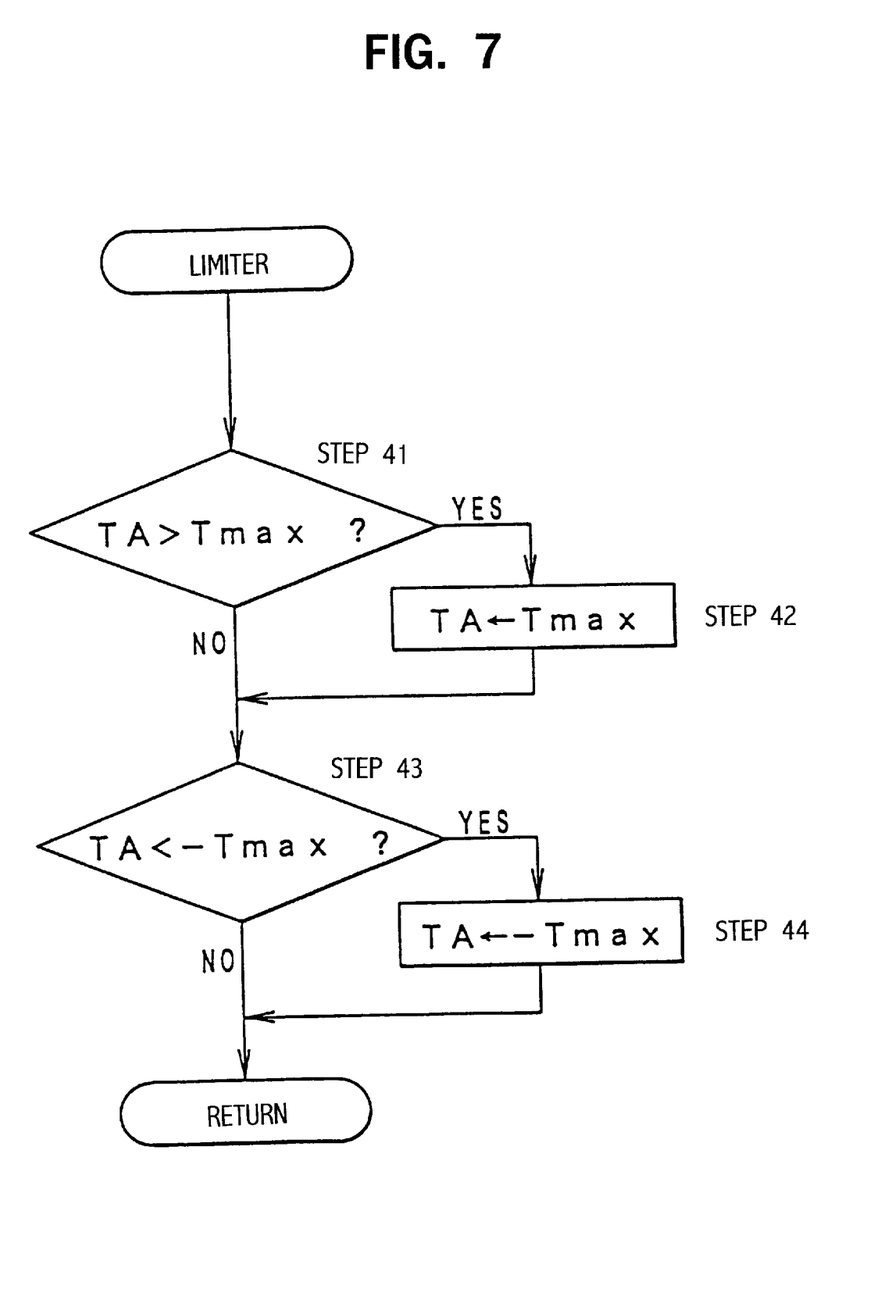
FIG. 7 is a flow chart showing the control process for the steering system.

The processes carried out in steps 1, 4 and 5 are described in greater detail with reference to FIGS. 5 through 7 as well.

In step 1, the following sub steps are carried out. First of all, the steering angle θ is read (step 21 of FIG. 5), and this signal is differentiated with time to compute the steering angular speed dθ/dt (step 22). Then, the vehicle speed V and the yaw rate δ are read (steps 23 and 24).

In step 4, a yaw rate reaction coefficient Kr and a damping reaction coefficient Kd are obtained from data tables as shown in FIG. 8 using the vehicle speed V as their address (step 31 of FIG. 6), and the steering reactions Tr and Td from these components are respectively computed (step 32). Then, the two components of the steering reaction Tr and Td are added to each other to determine the target steering reaction TA (step 33).

Figure 8A:
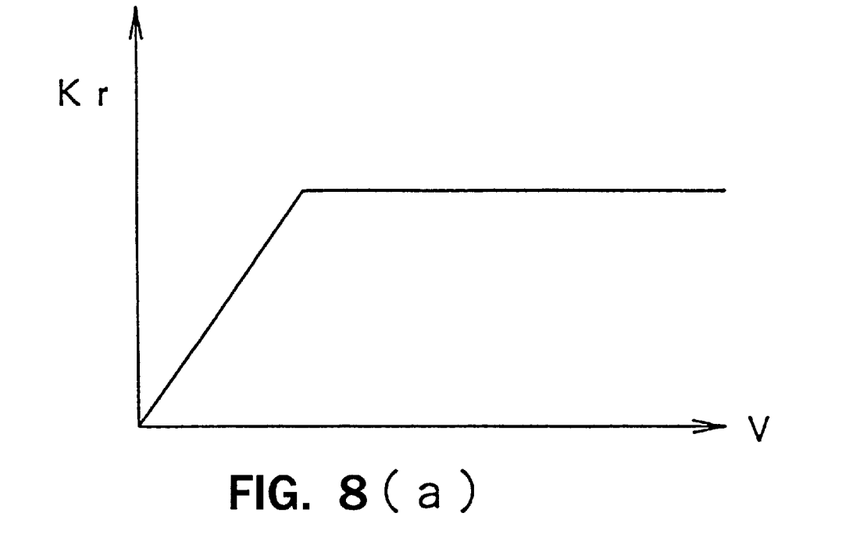
FIGS. 8(a) and 8(b) are data tables used in the control process.

Referring to FIG. 8(a), the yaw rate reaction coefficient Kr is set to zero when the vehicle speed is zero so that no reaction may be generated when the vehicle is stationary or at an extremely low speed (for instance when the vehicle is being turned by a turntable of a parking garage).

Figure 8B:
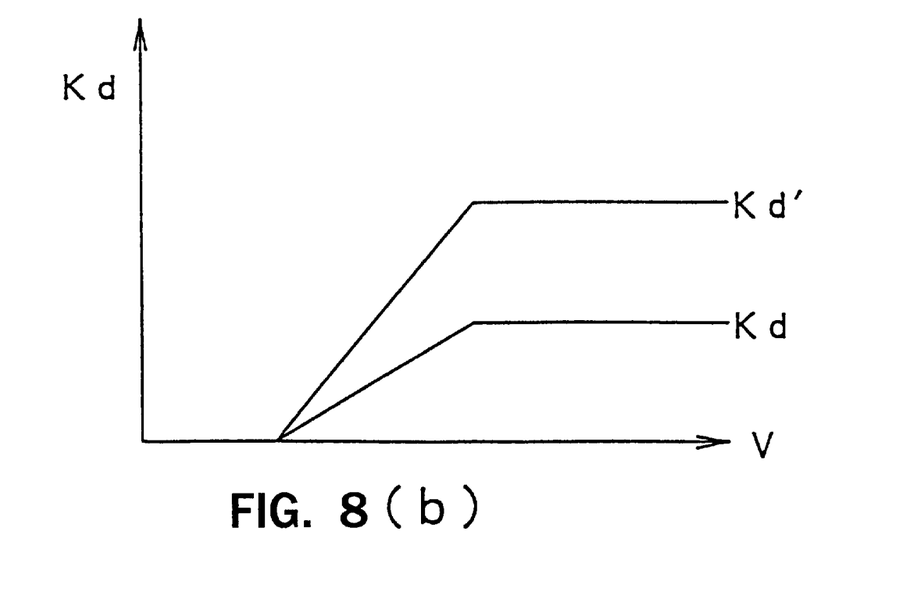

Referring to FIG. 8(b), it is determined with an algorithm not shown in the drawing if the vehicle operator is firmly holding the steering wheel or he is letting the steering wheel go free. In the latter case, the damping reaction coefficient is increased (Kd') to increase the resistance of the vehicle against crosswind. If he is turning the steering wheel, the damping reaction coefficient is decreased (Kd) so as to reduce the effort required for steering. By setting the damping reaction coefficient Kd or Kd' zero when the vehicle is stationary or travelling at an extremely low speed, the effort required for turning the steering wheel is reduced, and the steering wheel may have a tendency to return to the neutral position.

$Tr=Kr \cdot \delta$ $Td=Kd \cdot \theta$

In step 5, it is determined if the target steering reaction TA exceeds a prescribed value (Tmax) or not (step 41 of FIG. 7), and if the target steering reaction TA exceeds the prescribed value, the target steering reaction TA is set at Tmax (step 42). If the target steering reaction TA is less than the prescribed value (Tmax), it is similarly determined if the target steering reaction TA falls below a prescribed value (−Tmax) or not (step 43), and if the target steering reaction TA is less (larger in the absolute value) than the prescribed value, the target steering reaction TA is set at −Tmax (step 44).

The thus determined target steering reaction TA is added to the target assisting steering torque computed separately, and is converted into a target current value by the output current determining means 24 which is then supplied to the drive circuit 21.

In this manner, when the vehicle is subjected to a crosswind when travelling a straight ahead course, and has started to deviate from the straight ahead course, the electric motor is driven in the direction to cancel the yaw rate δ of the vehicle or to restore the vehicle back on the straight ahead course.

Figure 4:
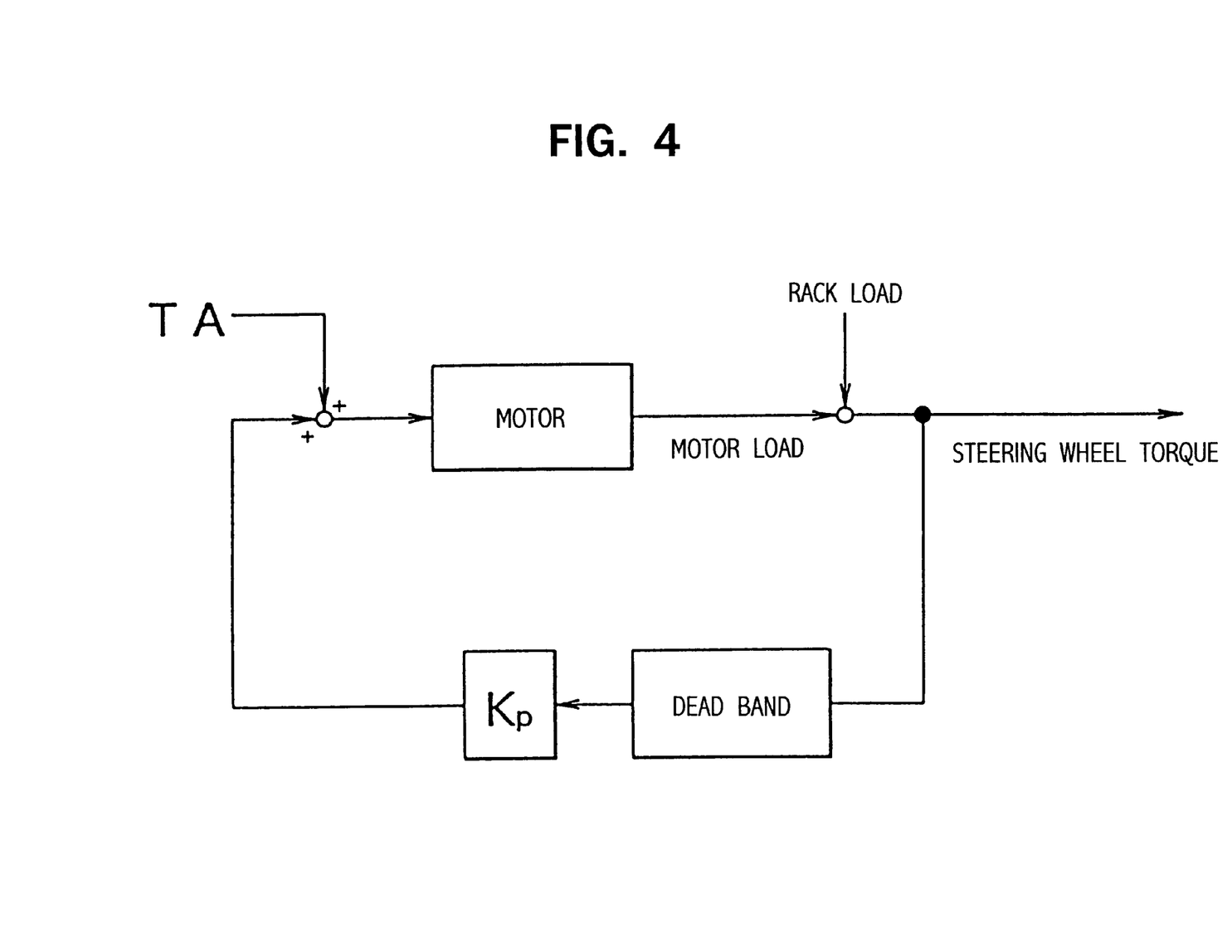
FIG. 4 is a control block diagram of the steering system.

If any reaction generating part of the system such as the yaw rate sensor 17 or the active reaction control means 23 was found to be faulty in step 2, 3 or 7, TA is set to zero and Kp is replaced by Kp' (Kp>Kp') in FIG. 4 so that the feel of the steering wheel is made slightly heavier or to the level which is encountered when TA is applied under normal driving condition, and a sudden change in the operability of the steering system is avoided.

Figure 9:
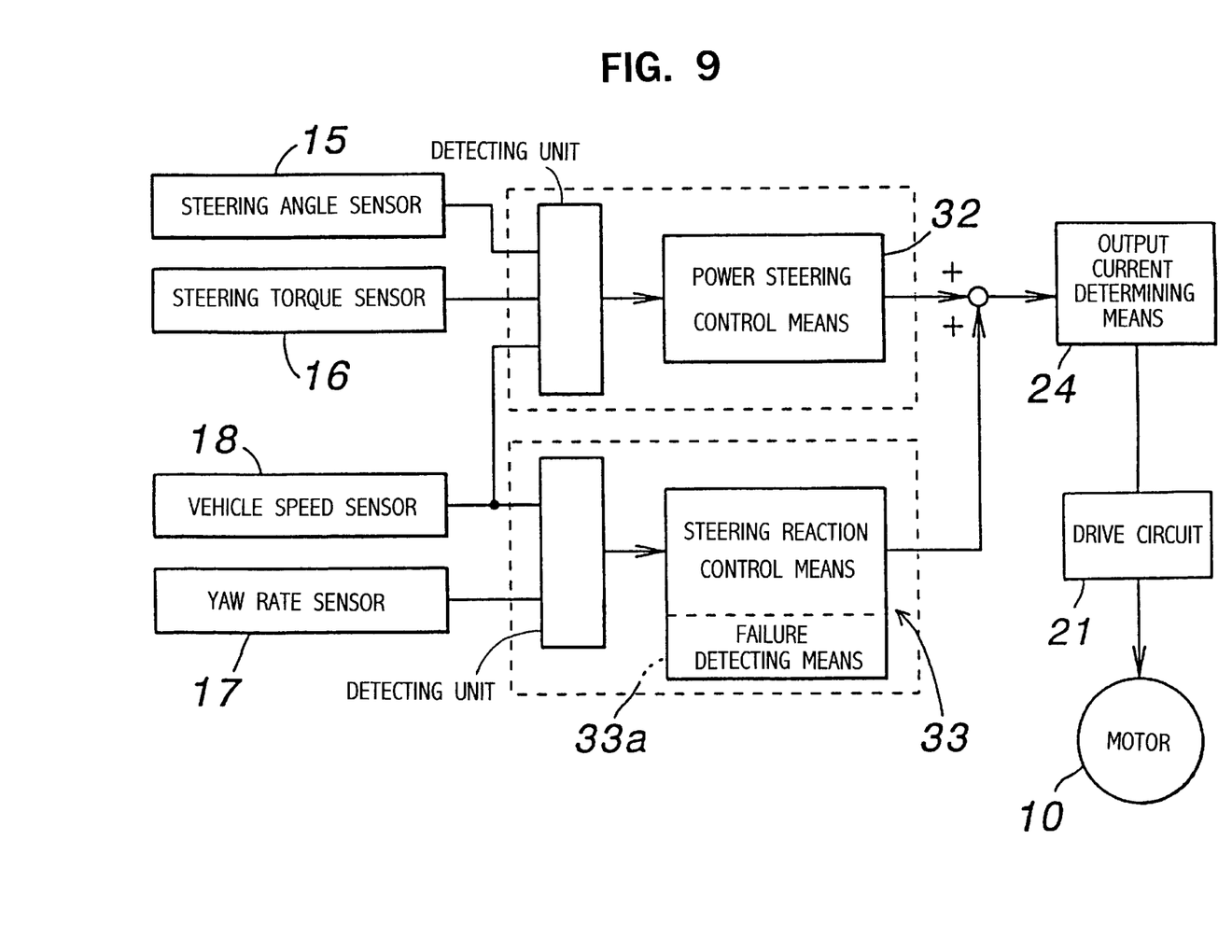
FIG. 9 is a circuit block diagram showing the structure of the control system for the steering system constructed as a second embodiment of the present invention.

FIG. 9 is a schematic block diagram similar to FIG. 2 showing the control system used in the second embodiment of the present invention. In this embodiment, the output signals from the steering angle sensor 15, the torque sensor 16 and the vehicle speed sensor are supplied to the assist steering torque control means 32 while the output signals of the yaw rate sensor 17 and the vehicle speed sensor 18 are separately supplied to the active reaction control means 33 so that the two means may process the corresponding signals independently from each other and in parallel to each other.

The active reaction control means 33 is provided with failure detecting means 33a, similar to the corresponding means of the first embodiment, which diagnoses the sensors and the active reaction control means 33 itself. Depending on the result of the diagnosis, the output of the target reaction value from the active reaction control means 33 is prohibited, and a fixed target reaction value is instead produced, similarly as the first embodiment.

In the first embodiment, because the assist steering torque control means and the active reaction control means were incorporated in a same control unit, and may share common component parts, the assist steering torque control means and the active reaction control means may fail at the same time. However, in this embodiment, because the two control means are provided independently from each other, even when the active reaction control means should fail, the assist steering torque control means would be able to continue to operate. Otherwise, the second embodiment is similar to the first embodiment.

Thus, according to the present invention, when the lateral acceleration sensor, the yaw rate sensor or the reaction control means has failed, the assist steering torque can still be generated. Therefore, a failure in the turning behavior detecting means and/or the reaction control means such as the lateral acceleration sensor, and the yaw rate sensor will not seriously impair the function of the steering system, and the operability of the steering system can be maintained. Additionally, by reducing the steering torque from the normal level, which is effective when the sensors are operating normally, at such a time, the driveability of the steering system similar to that under the normal condition can be ensured.

Although the present invention has been described in terms of specific embodiments thereof, it is possible to modify and alter details thereof without departing from the spirit of the present invention.

What we claim is:

1. A vehicle steering system, comprising:
   power means for applying a steering torque to steerable wheels of a vehicle;
   power assist control means for detecting a steering torque input produced by a steering effort made by a vehicle operator, and producing a command to said power means to produce an assisting steering torque according to detected steering torque input;
   reaction control means for producing a command to said power means to produce a steering wheel reaction in response to a turning maneuver of said vehicle;
   failure detecting means for detecting a failure of said reaction control means; and
   means for prohibiting said reaction control means from producing said command to said power means to produce said steering wheel reaction when said failure detecting means has detected a failure in said reaction control means.

2. A vehicle steering system according to claim 1, wherein said reaction control means comprises sensor means to detect a turning movement of said vehicle, and a reaction control unit for producing a drive signal to said power means according to an output from said sensor means.

3. A vehicle steering system according to claim 2, wherein said sensor means comprises a lateral acceleration sensor.

4. A vehicle steering system according to claim 2, wherein said sensor means comprises a yaw rate sensor.

5. A vehicle steering system, comprising:

power means for applying a steering torque to steerable wheels of a vehicle;

power assist control means for detecting a steering torque input produced by a steering effort made by a vehicle operator, and producing a command to said power means to produce an assisting steering torque according to detected steering torque input;

reaction control means for producing a command to said power means to produce a steering wheel reaction in response to a turning maneuver of said vehicle;

failure detecting means for detecting a failure of said reaction control means;

means for prohibiting said reaction control means from producing said command to said power means to produce said steering wheel reaction when said failure detecting means has detected a failure in said reaction control means; and said assisting steering torque produced by said power means according to the command from said power assist control means is reduced from a normal level when said failure detecting means has detected a failure in said reaction control means.

6. A vehicle steering system according to claim 5, wherein said assisting steering torque produced by said power means according to a command from said power assist control means is reduced from said normal level to a predetermined level when said failure detecting means has detected the failure in said reaction control means.

7. A vehicle steering system, comprising:

power means for applying a steering torque to steerable wheels of a vehicle;

power assist control means for detecting a steering torque input produced by a steering effort made by a vehicle operator, and producing a command to said power means to produce an assisting steering torque according to detected steering torque input;

reaction control means for producing a command to said power means to produce a steering wheel reaction in response to a turning maneuver of said vehicle;

failure detecting means for detecting a failure of said reaction control means;

means for prohibiting said reaction control means from producing said command to said power means to produce said steering wheel reaction when said failure detecting means has detected a failure in said reaction control means;

said reaction control means comprising sensor means to detect a turning movement of said vehicle, and a reaction control unit for producing a drive signal to said power means according to an output from said sensor means; and said power assist control means comprising a power assist control unit for producing another drive signal to said power means, and a torque sensor for detecting a steering torque applied to a steering wheel of said vehicle, said power assist control unit operating independently from said reaction control unit.

8. A vehicle steering system comprising:

power means for applying a steering torque to steerable wheels of a vehicle;

power assist control means for detecting a steering torque input produced by a steering effort made by a vehicle operator, and producing a command to said power means to produce an assisting steering torque according to detected steering torque input;

reaction control means for producing a command to said power means to produce a steering wheel reaction in response to a turning maneuver of said vehicle;

failure detecting means for detecting a failure of said reaction control means;

means for prohibiting said reaction control means from producing said command to said power means to produce said steering wheel reaction when said failure detecting means has detected a failure in said reaction control means; and said failure detecting means additionally detects a failure of another part of said vehicle steering system, and stops an overall control of said vehicle steering system when it has detected an important failure in said other part of said vehicle steering system.

9. A vehicle steering system according to claim 8, wherein said failure detecting means determines that a detected failure has occurred in an important part of the steering system only when the failure detecting means has already determined that the detected failure is not in the reaction control means.

10. A vehicle steering system, comprising:

power means for applying a steering torque to steerable wheels of a vehicle;

power assist control means for detecting a steering torque input produced by a steering effort made by a vehicle operator, and producing a command to said power means to produce an assisting steering torque according to detected steering torque input;

reaction control means for producing a command to said power means to produce a steering wheel reaction in response to a turning maneuver of said vehicle;

failure detecting means for detecting a failure of said reaction control means;

means for prohibiting said reaction control means from producing said command to said power means to produce said steering wheel reaction when said failure detecting means has detected a failure in said reaction control means; and said power assist control means and said reaction control means include respective control units operable independently of each other.

11. A vehicle steering system, comprising:

power means for applying a steering torque to steerable wheels of a vehicle;

power assist control means for detecting a steering torque input produced by a steering effort made by a vehicle operator, and producing a command to said power means to produce an assisting steering torque according to detected steering torque input;

reaction control means for producing a command to said power means to produce a steering wheel reaction in response to a turning maneuver of said vehicle;

failure detecting means for detecting a failure of said reaction control means;

means for prohibiting said reaction control means from producing said command to said power means to produce said steering wheel reaction when said failure detecting means has detected a failure in said reaction control means; and said power assist control means produces the command to said power means to produce an assisting torque even when said failure detecting means has detected a failure in said reaction control means.

* * * * *

UNITED STATES PATENT AND TRADEMARK OFFICE
CERTIFICATE OF CORRECTION

PATENT NO : 6,018,691
DATED : 25 January 2000
INVENTOR(S) : Y. Yamamoto, Y. Nishi, T. Nishimori, H. Tokunaga It is certified that error appears in the above-identified patent and that said Letters Patent is hereby corrected as shown below:

On the cover page, under "[56] References", for U.S. Patent Document 5,135,069, change "188/142" to --180/142--;
 in the "[57] ABSTRACT", 1st line, change "is provided is" to --is provided--.

Column 2, line 35, change "the produced" to --be produced--;
 line 59, change "be substantially reduced" to --substantially reduce--.

Column 5, line 7, change "$\delta$" to --$\gamma$--;
 line 34, change "Tr = Kr · $\delta$" to --Tr = Kr · $\gamma$--;
 line numbered between 54 and 55, change "$\delta$" to --$\gamma$--.

Signed and Sealed this

Fifth Day of December, 2000

Attest:

Q. TODD DICKINSON

*Attesting Officer*     *Director of Patents and Trademarks*